United States Patent
Beardow et al.

(10) Patent No.: US 10,171,209 B2
(45) Date of Patent: Jan. 1, 2019

(54) METHOD FOR COMMUNICATING MEDIA DATA BETWEEN TWO DEVICES INCORPORATING EFFECTIVENESS OF ERROR CORRECTION STRATEGIES AND ASSOCIATED COMPUTER PROGRAM, COMMUNICATION QUALITY MODULE AND DEVICE

(71) Applicant: Orange, Paris (FR)

(72) Inventors: Paul Beardow, Easton Somerset (GB); Pierre Bonnefoy, Luce (FR); Julien Chavanton, Paris (FR); Federico Cabiddu, Chatillon (FR); Dragos Oancea, Bucharest (RO)

( * ) Notice: Subject to any disclaimer, the term of this patent is extended or adjusted under 35 U.S.C. 154(b) by 39 days.

(21) Appl. No.: 15/316,831

(22) PCT Filed: Jun. 25, 2015

(86) PCT No.: PCT/EP2015/064460
§ 371 (c)(1),
(2) Date: Dec. 6, 2016

(87) PCT Pub. No.: WO2015/197795
PCT Pub. Date: Dec. 30, 2015

(65) Prior Publication Data
US 2017/0126372 A1    May 4, 2017

(30) Foreign Application Priority Data

Jun. 27, 2014 (EP) .................................. 14306030

(51) Int. Cl.
*H03M 13/00* (2006.01)
*H04L 1/20* (2006.01)
(Continued)

(52) U.S. Cl.
CPC .............. *H04L 1/20* (2013.01); *H04L 1/0002* (2013.01); *H04L 1/0009* (2013.01);
(Continued)

(58) Field of Classification Search
CPC ....... H04L 1/20; H04L 1/0018; H04L 1/0026; H04L 1/1835; H04L 43/16; H04L 1/0003;
(Continued)

(56) References Cited

U.S. PATENT DOCUMENTS 6,804,244 B1 * 10/2004 Anandakumar ...... H04L 1/0001
370/328
7,298,696 B1    11/2007 Wu
(Continued)

FOREIGN PATENT DOCUMENTS

EP    0 944 201 A2    9/1999

OTHER PUBLICATIONS

International Search Report and Written Opinion of the International Searching Authority dated Dec. 12, 2015 for International Application No. PCT/EP2015/064460 filed Jun. 25, 2015.

*Primary Examiner* — Guerrier Merant
(74) *Attorney, Agent, or Firm* — Knobbe, Martens, Olson & Bear, LLP

(57) ABSTRACT

One embodiment relates to a method for communicating multimedia data between two devices over a network. The method comprises the devices repeatedly generating and exchanging the multimedia data and quality data representative of the quality of the communication between the two devices. At least the first device applies at least one current error correction strategy selected from a group of error correction strategies in order to increase the quality of the communication between the devices. The method also comprises an evaluation of an effectiveness of each current error correction strategy on the quality of the communication
(Continued)

between the two devices is carried out as a function of newly received quality data.

19 Claims, 7 Drawing Sheets

(51) Int. Cl.
  *H04L 1/00* (2006.01)
  *H04L 1/18* (2006.01)
  *H04L 12/26* (2006.01)
(52) U.S. Cl.
  CPC .......... *H04L 1/0013* (2013.01); *H04L 1/0018* (2013.01); *H04L 1/0026* (2013.01); *H04L 1/1835* (2013.01); *H04L 43/16* (2013.01); *H04L 1/203* (2013.01)
(58) Field of Classification Search
  CPC ....... H04N 21/23617; H04N 21/23655; H04N 21/2383; H04N 21/2389; H04N 21/2402; H04N 21/26291; H04N 21/2662; H04N 21/41407; H04N 21/4349; H04N 21/4382; H04N 21/4385
  See application file for complete search history.

(56) References Cited

U.S. PATENT DOCUMENTS

| | | | |
|---|---|---|---|
| 8,826,102 B2* | 9/2014 | Liu | H04L 1/0009 714/758 |
| 2004/0160979 A1* | 8/2004 | Pepin | H04L 1/0009 370/462 |
| 2008/0219334 A1* | 9/2008 | Brainos | H04L 1/0002 375/221 |
| 2008/0270528 A1* | 10/2008 | Girardeau | H04L 1/0007 709/203 |
| 2009/0019505 A1 | 1/2009 | Gopalakrishnan et al. | |
| 2012/0069927 A1* | 3/2012 | Oyman | H04L 1/0019 375/285 |
| 2013/0263201 A1* | 10/2013 | Chung-How | H04L 1/0003 725/116 |
| 2013/0343750 A1 | 12/2013 | Lanzone et al. | |

* cited by examiner

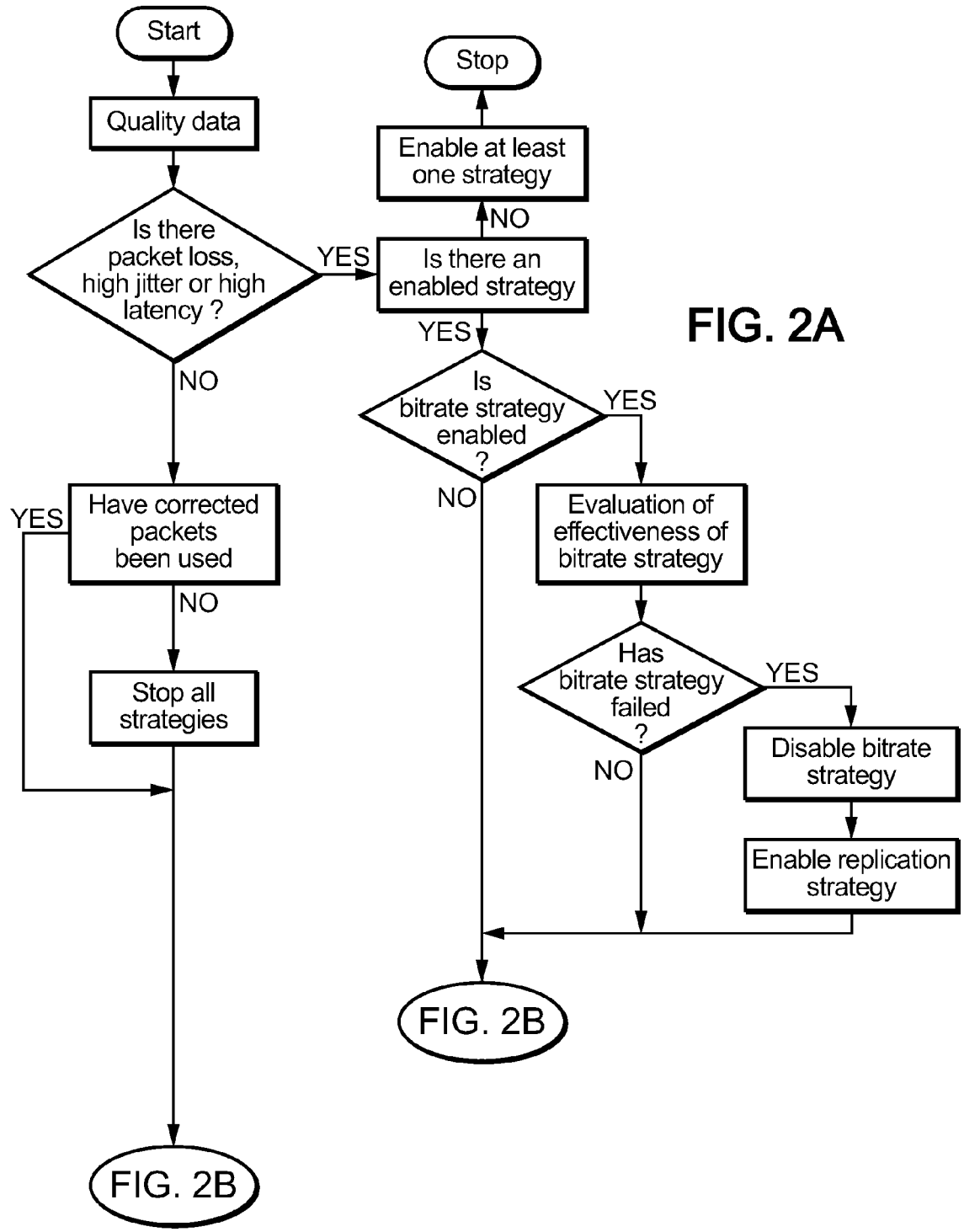

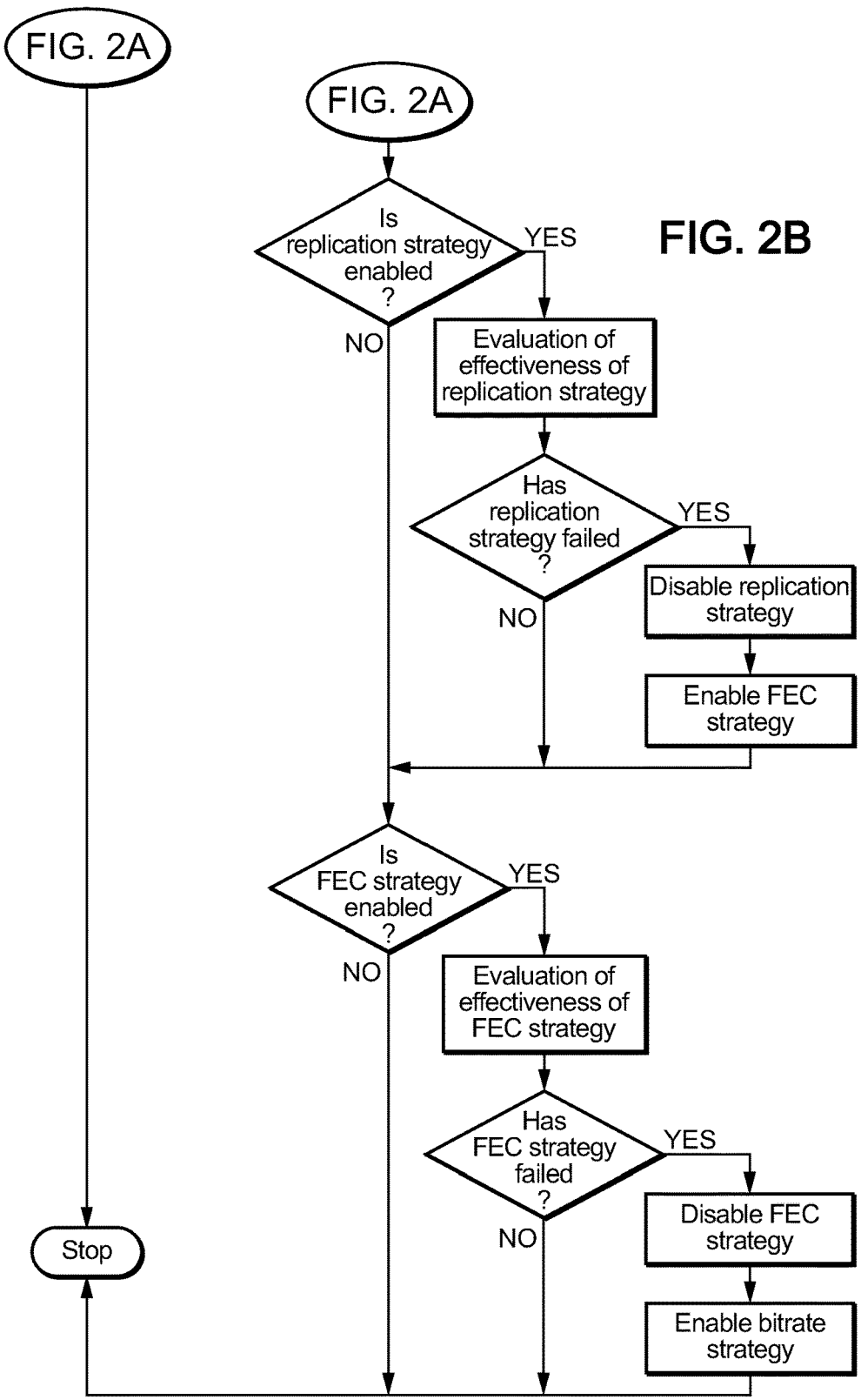

METHOD FOR COMMUNICATING MEDIA DATA BETWEEN TWO DEVICES INCORPORATING EFFECTIVENESS OF ERROR CORRECTION STRATEGIES AND ASSOCIATED COMPUTER PROGRAM, COMMUNICATION QUALITY MODULE AND DEVICE

RELATED APPLICATIONS

This application is the U.S. National Phase of Application No. PCT/EP2015/064460 entitled "METHOD FOR COMMUNICATING MEDIA DATA BETWEEN TWO DEVICES INCORPORATING EFFECTIVENESS OF ERROR CORRECTION STRATEGIES AND ASSOCIATED COMPUTER PROGRAM, COMMUNICATION QUALITY MODULE AND DEVICE" filed Jun. 25, 2015, which designated the United States, and which claims the benefit of European Application No. 14306030.9 filed Jun. 27, 2014.

When multimedia data, such as audio and/or video, are transmitted from one device to another using VoIP system, data is often lost, partly due to the nature of the communication protocol used for transmitting the data, such as UDP (User Datagram Protocol). So as to limit the negative effect of this data loss, correction strategies may be applied by the devices with a view to compensate for the data loss and increase the quality of the communication. For instance, such strategies include a forward error correction strategy by which the data packets are encoded so as to include information allowing their reconstruction when received, or data replication techniques by which the packets are replicated, which increases the chances of the data getting to the other device across the network. However such correction strategies may yield undesirable effects: in fact, they can exacerbate the errors by further congesting the network. Additionally, the effects of a given strategy on the quality of the communication between the devices is generally improperly evaluated, which may cause any action aimed at improving the quality of the communication, such as keeping a strategy enabled, further degrading the actual quality of the communication between the two devices.

It is therefore an object of the present invention to improve the situation.

To that end, the invention relates to a method for communicating multimedia data between a first device and a second device over a network, the method comprising the steps of:
- at least the first device repeatedly generates multimedia data and sends said multimedia data to the second device,
- at least the second device repeatedly generates quality data representative of the quality of the communication between the two devices,
- at least the first device applies at least one current error correction strategy selected from a group of error correction strategies, in view of increasing the quality of the communication between the devices,
- an evaluation of an effectiveness of each current error correction strategy on the quality of the communication between the two devices is carried out as a function of newly received quality data.

As a consequence, the impact of any error correction strategy in vigor is kept under watch with an enhanced precision. Therefore, the evaluation of all the strategies is itself more precise.

According to a further embodiment, for each current correction strategy, the first device determines, as a function of said effectiveness, whether said current correction strategy is to be modified. As a consequence, the response to the effect of any strategy on the quality of the communication can be adjusted with more refinement.

According to a further embodiment, for each current correction strategy, the first device modifies at least one parameter of said current error correction strategy as a function of said effectiveness. Therefore, a precise configuration of any given strategy can be adopted in response to the evaluation.

In another embodiment, for each current correction strategy, the first device replaces said current error correction strategy by another error correction strategy as a function of said effectiveness.

According to a further embodiment, the quality data comprise general quality data representative of the overall communication quality and correction data representative of a quantity of packets of the multimedia data corrected by the second device using the error correction strategy, the first device carrying out said evaluation as a function of both the general quality data and the correction data sent by the second device. As a consequence, the evaluation of a strategy factors in both the impact of the strategy on the overall quality of the communication and its management by the device which employs it, and is therefore much more refined.

In a further embodiment, the general quality data comprise information representative of packet loss, jitter and/or latency between the two devices, the first device selecting at least one error correction strategy from the group of error correction strategies and applying said at least one error correction strategy when one element among packet loss, jitter and latency is above a chosen threshold. Thus, the devices attempt to improve the quality of the communication as soon as an overall quality indicator indicates a degraded quality. In an embodiment, the quality data are organized in reports exchanged at regular intervals and the first device carries out said evaluation upon reception of each report.

In a further embodiment, the first device keeps track of a strategy counter for each of the device's current error correction strategy, the strategy counter of a given error correction strategy being incremented at least when the packet loss for the multimedia data sent by the first device is above a chosen high threshold. Therefore, the impact of a strategy on the quality of the communication can be tracked in a simple and efficient manner.

In another embodiment, the strategy counter of a given error correction strategy is reset at least when the packet loss for the multimedia data sent by the first device is below a chosen low threshold. In the same manner, the success of a strategy is kept track of in an efficient manner and allows the strategy to be employed further.

In a specific embodiment, a given error correction strategy is detected as failing when the associated strategy counter reaches a chosen value and is deactivated. This allows a gradual response to a strategy to be applied and prevents the application of a corrective action upon a non-significant evaluation.

In a further embodiment, the group of error correction strategies comprises at least a bitrate strategy, a replication strategy, and a forward error correction strategy.

In a further embodiment, at least the second device employs a buffer management scheme to process the multimedia data sent by the first device so that the communication between the two devices occurs in real-time conditions.

In a further embodiment, the multimedia data are exchanged in the form of packets which are temporarily stored in a buffer memory of the second device, and the buffer management scheme includes removing at least some of the packets from the buffer memory prior to the content of the buffer memory being rendered by the second device.

In a further embodiment, the buffer management scheme includes determining packets to remove from the buffer memory and removing said packets, said packets to remove being determined as a function of a number of lost packets, a number of received packets and an estimated latency between the two devices.

In a further embodiment, the packets are removed evenly across the buffer memory. In a further embodiment, the packets to remove are also determined as a function of the multimedia data they contain.

In a further embodiment, over at least a period of time,
both devices repeatedly generate multimedia data and send said multimedia data to the other device,
both repeatedly generates quality data representative of the quality of the communication between the two devices,
both devices apply at least one current error correction strategy selected from a group of error correction strategies, in view of increasing the quality of the communication between the devices,
an evaluation of an effectiveness of each current error correction strategy on the quality of the communication between the two devices is carried out as a function of newly received quality data.

The invention also relates to a computer program comprising instructions for carrying out the method according to any of the preceding claims when executed by a processor.

In addition, the invention relates to a communication quality module adapted to receive quality data representative of the quality of a communication between two devices exchanging multimedia data over a network,
at least the first device being adapted to each apply at least one current error correction strategy selected from a group of error correction strategies in view of increasing the quality of the communication between the devices,
the communication quality module being configured to carry out an evaluation of an effectiveness of each current error correction strategy on the quality of the communication between the two devices as a function of newly received quality data.

Moreover, the invention relates to a communication device comprising a communication quality module as defined above.

Further features and advantages of the invention will become more apparent by reading the following detailed description of the embodiments, which are given by way of non-limiting examples with reference to the appended drawings, in which:

FIG. 2 illustrates a flow diagram of a method for communicating multimedia data between the two devices of FIG. 1.

Figure 1:
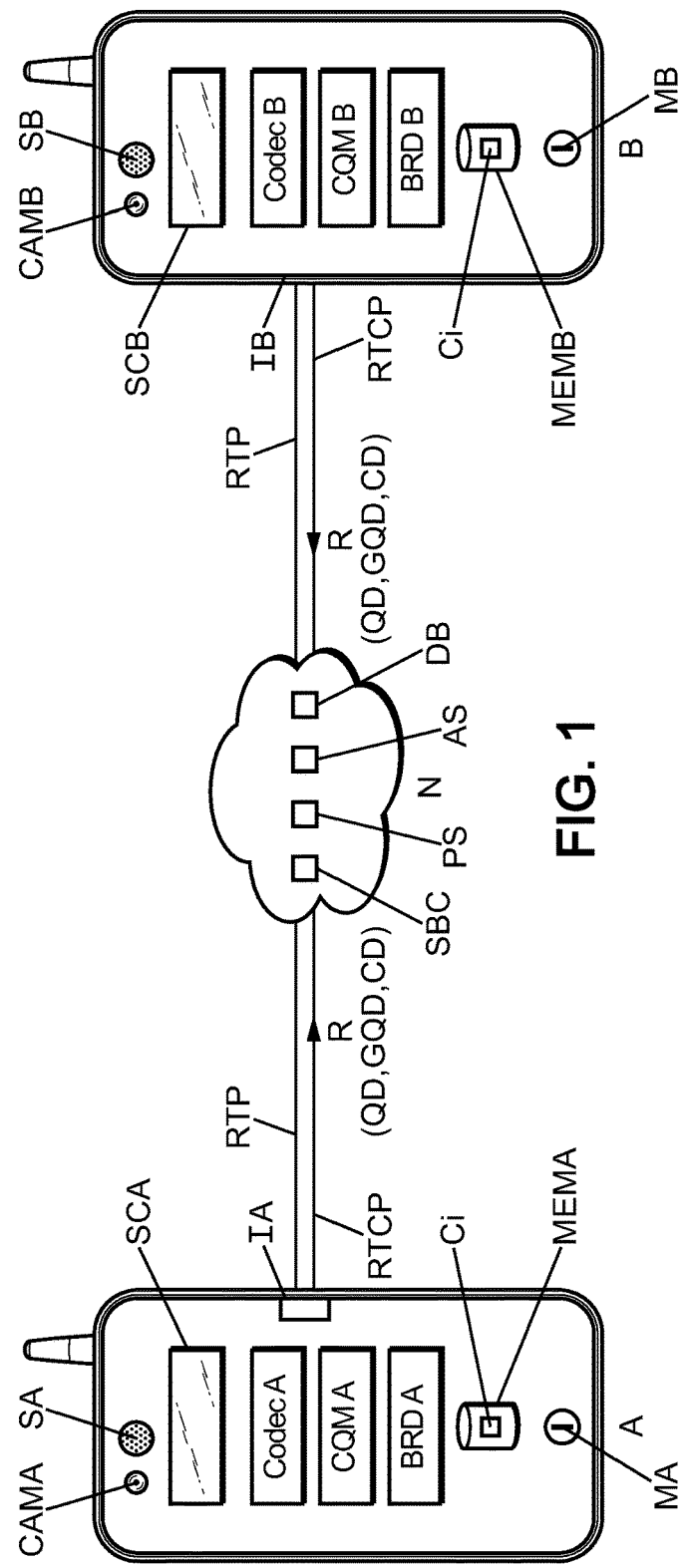
FIG. 1 illustrates a communication between two devices according to the invention.

FIG. 1 illustrates a first device A and a second device B in communication over a network N. For instance, the network N comprises a Session Border Controller SBC to which the devices are connected, a proxy server PS exchanging messages with the controller SBC using the Session Initiation Protocol (SIP) and connected to an Accounting Server AS managing the minute counting and itself connected to a Subscriber Database DB.

In the context of the invention, the devices exchange multimedia data. For instance, the multimedia data comprise audio data and/or video data. For instance, the devices exchange audio data, the two devices and the network N forming a Voice over IP system, or VoIP system. In addition to the multimedia data themselves, the devices A and B also repeatedly generate and exchange quality data QD representative of the quality, of the communication between the two devices. The quality data QD may also be known as Quality of Service (QoS) data.

For instance, the multimedia data are in the form of packets exchanged between the devices A and B using RTP, for Real-Time Transport Protocol. For instance, the packets of multimedia data rely on UDP, or User Datagram Protocol. In other, the packets of multimedia data are UDP packets.

For instance, the quality data are in the form of packets exchanged using RTCP, for Real-Time Transport Control Protocol. For instance, the packets of the quality data are also UDP packets. The RTP and RTCP protocols are illustrated by different lines on FIG. 1. The quality data QD are organized as reports R known as RTCP Sender Reports and exchanged using RTCP. These reports are repeatedly generated by the devices and sent to the other device every few seconds, for instance every five seconds. The interval between two consecutive reports R is referred to in what follows as a time window. Each report R represents the quality of the communication during a time window as seen by the device that generates it.

Each report R contains general quality data GQD representative of the overall communication quality between the devices. More specifically, the general quality data GQD comprise:
Transmitted octet and packet counts during the time window,
Lost packet count during the time window,
Jitter data representative of the jitter during the time window, and
Round-trip delay time during the time window, also known as latency.

In a known manner, the transmitted octet and packet counts and the lost packet count are representative of what is known as packet loss, a phenomenon by which packets fail to reach their destination across a network. Packet loss is an important factor for the quality of the communication between devices as it quickly renders a communication between devices hard to understand, if not unintelligible. Jitter and latency also cause a degradation of the quality of the communication.

When the quality of the communication between the two devices is not optimal, in view of improving this quality, the devices A, B are configured to apply, at a given time, at least one current correction error strategy selected from a group of correction error strategies.

For instance, the respective strategies employed by the two devices are the same at a given time. Alternatively, the devices may apply different strategies at a given time.

For instance, the group of error correction strategies comprises three strategies S1, S2 and S3.

For instance, S1 is a bitrate strategy, S2 is a replication strategy and S3 is a forward error correction strategy.

A bitrate strategy is a strategy in which the rate with which the packets of the multimedia data are sent by a device is variable and may be modified, i.e. increased or decreased. A bitrate strategy presents a bitrate value, which corresponds to the rate with which the packets are sent, comprised between a maximum bitrate and a minimum bitrate.

A replication strategy applied by a device, for instance device A, is a strategy in which a quantity of packets of the multimedia data sent by device A is replicated by device A, thereby forming original packets and replicated packets with the same content to be received by the other device, here device B. For a given time window, a replication strategy exhibits a percentage of replicated packets which corresponds to the number of received replicated packets whose original packets were not received, divided by the number of expected original packets. The percentage of replicated packets is inferior or equal to a maximum percentage of replicated packets.

A forward error correction strategy (or FEC strategy) is a strategy in which a given number of packets from the multimedia data are built so as to include additional information allowing the reconstruction of missing or erroneous packets. A forward error correction strategy presents a percentage of such packets, herein labelled as FEC packets, used to correct errors. This percentage, or FEC packets percentage, corresponds to the number of FEC packets used to correct errors as a percentage of the number of total packets received over a time window. If there are replicated packets, the number of total packets sent does not take into account the replicated packets. The FEC packets percentage has a maximum value.

According to the invention, the quality data QD also comprises correction data CD representative of a quantity of packets of the multimedia data corrected by the device using each current error correction strategy of the other device. The correction data QD comprises the above parameter respectively associated with each strategy: the bitrate value, the percentage of replicated packets and the FEC packets percentage. The quality data also comprise, for each strategy from the group of error correction strategies, a flag Fi (i=1, 2, 3 . . . ) indicating whether the corresponding strategy was active during the time window the report R relates to. The flags Fi and the correction data CD are part of the reports R.

In other words, for the example strategies above, in addition to the general quality data GQD, each report R related to a time window comprises the following correction data CD:
- a bitrate flag F1 indicating whether the bitrate strategy was active during the time window of the report R,
- a replication flag F2 indicating whether the replication strategy was active during the time window,
- a FEC flag F3 indicating whether the FEC strategy, was enabled during the time window,
- the bitrate value during the time window if the bitrate strategy was enabled,
- the percentage of replicated packets used during the time window if the replication strategy was enabled, and
- the FEC packets percentage during the time window if the FEC strategy was enabled.

For instance, the flags correspond to one bit of data. In addition, the bitrate value, the percentage of replicated packets and the FEC packets percentage each correspond to 8 bits of data.

Regarding FIG. 1, in which the letter A designates a component of device A and the letter B designates a component of device B, each device A, B comprises a microphone MA, MB for capturing audio data, a camera CAMA, CAMB for capturing video data, a speaker SA, SB for rendering audio data, a screen SCA, SCB for displaying video data and a communication interface IA, IB connected to the network N for sending and receiving the multimedia data and the quality data from the other device across the network N. In addition, each device A, B comprises a media engine MEA, MEB. Each media engine MEA, MEB comprises a coder-decoder module A, B, or CODEC A, B.

Each CODEC A, B is configured to build the multimedia data from the output of the microphone MA, MB and of the camera CAMA, CAMB and to process the multimedia sent by the other device with a view to output the audio and/or video data via the speaker SA, SB and/or the screen SCA, SCB. In particular, the CODEC A, B uses the packets that have been modified (if any) by the strategy applied by the sending device, i.e. the other device, so as to process the received multimedia data. For instance, the CODEC A, B are software modules processed by a processing unit, or CPU, of the device (not shown). The processing unit may be a dedicated processing unit, or a processing unit which is also involved in other tasks, such as managing the other components of the device for the normal operations of the device. Each CODEC may implement normalized processes of coding and/or decoding data.

The media engine MEA, MEB also comprises a Real-Time management module RTMA, RTMB configured to process the multimedia data so that the exchange of multimedia data by the devices occurs in real-time conditions.

By "real-time", it is to be understood that the media engine, MEA, MEB is configured so that the delay between the capture of the video and/or audio input to be encoded in the multimedia data and the rendering by the other device of the video and/or audio data conveyed through the multimedia data is inferior to 200 ms. Preferably, it is inferior to 150 ms. These values correspond to delays above which the quality of the communication between the devices, in particular in a context of an audio conversation which may include video data, is perceived as poor by the participants.

The media engines MEA, MEB are coupled to the corresponding memory MEMA, MEMB, and are configured to use part of the corresponding memory as a buffer memory, in particular for the temporary storage of the multimedia data received from the other device. The packets of multimedia data which are stored in the buffer comprise an emission timestamp $t_e$ indicative of their instant of emission by the device that sent them, and a reception timestamp $t_r$ indicative of their instant of reception by the device which received them.

So as to obtain the real-time conditions described above, the media engine MEA, MEB is configured to implement a buffer management scheme by which part of the content of the buffer memory is removed prior to the content of the buffer memory being rendered by the device. In particular, the buffer management scheme relies on the regular removal of packets contained in the buffer. This buffer management scheme is explained in greater details below.

For instance, the real-time management modules RTMA, RTMB comprise a software module containing computer programs whose execution by a processing unit implements the functionalities of these modules.

Each device A, B further comprises a bitrate driver BRDA, BRDB configured to modify the bitrate with which the corresponding device sends the packets of multimedia data. For instance, the bitrate drivers are software modules.

Each device A, B also comprises a communication quality module CQMA, CQMB configured to generate the quality data QD associated with its device A, B and analyze the quality data QD received from the other device. In particular, each communication quality module CQMA, CQMB is configured to carry out an evaluation of an effectiveness of each current error correction strategy enabled by the device on the quality of the communication based on the quality data QD received from the other device.

The above components of a given device are connected together so as to exchange information.

For instance, each device A, B is a cellphone, such as a smartphone, a wearable device, a smart TV, an automobile entertainment system, a video game console or a tablet computer. The method of communicating multimedia data between the two devices according to the invention will now be described in reference to FIGS. 2 to 5.

This method may be implemented in an asymmetric configuration, in which one of the devices, for instance the device A, acts a source of the multimedia data, whereas the second device acts as the receiving end of the multimedia. This configuration corresponds to what is commonly observed during a conversation between two persons, as at a given time, generally only one of the persons is speaking. However, this method may also be implemented in a symmetric configuration in which both devices repeatedly generate and send the multimedia data to the other device, the other device repeatedly generating the quality data and sending these data back to the other device. This configuration is, among others, appropriate for configurations in which even if one person is not speaking, multimedia data are still sent by his device to the other device. This is for instance the case in communication activities involving a video component.

Moreover, over a given period of time, switches between these configuration may be carried out, for instance due to the users intermittently speaking at the same time in applications only involving voice data exchange.

The following description is given for an asymmetric configuration in which the first device A generates the multimedia data while the second device B receives these multimedia data, generates the quality data and sends the quality data to the first device. The passage to a symmetric configuration is easily obtained by considering that both devices carry out the same operations in parallel.

Initially, the devices A and B initiate a communication over the network N. For instance, an invitation is sent by device A via SIP signaling via the SBC and the proxy server PS to device B. The proxy server will then validate that device A is enabled to communicate with device B, the accounting server thereby starting the process of counting the duration of the communication.

Once the communication between the devices A, B is initiated, the first device A generates and sends the multimedia data to the second device B. The second device B repeatedly generates and sends to the first device A the quality data QD in the form of the reports R, for instance every five seconds.

Upon reception of each report R, in view of FIG. 2, the communication quality module CQMA analyzes the received report and the quality data QD.

The analysis of a given report R is carried out as follows.

First, the communication quality module CQMA determines if the quality of the communication between the devices is optimal. The quality is optimal when the following conditions are all reunited:
there is no packet loss,
jitter is below a chosen threshold, and
the latency is below a chosen threshold.

In other words, whether the quality is optimal is determined based on the general quality data GQD.

The above thresholds can be determined by the man skilled in the art in a known manner to correspond to scenarios in which the quality is considered not optimal because of the associated parameter.

If the quality is optimal, based on the content of the correction data CD of the report R, the communication quality module CQMA moves on to determine if device B has used corrected packets generated via the current strategy (or strategies) of device A to obtain the multimedia data.

If so, the process stops.

If not, the communication quality module CQMA stops all current strategies of device A. If the quality is not optimal, the communication quality module CQMA determines if there was at least one current strategy enabled by device A during the time window. If there was none, at least one strategy is then enabled by the communication quality module CQMA. For instance, strategy S1, i.e. the bitrate strategy, is enabled. The process then stops here for the report R. On the contrary, if there was at least one current strategy, i.e. if at least one strategy was enabled during the time window, the communication quality module CQMA goes to carrying out an analysis of the effectiveness of each strategy enabled during the time window.

In fact, in view of FIG. 2, for each strategy of the group of strategies, the communication quality module CQMA first determines if the strategy is enabled by processing the associated strategy flag Fi. If it is not enabled, the communication quality module CQMA moves on to the next strategy. On the contrary, if the strategy is active, the communication quality module CQMA carries out the evaluation of the effectiveness of the strategy on the quality of the communication to determine if the strategy has failed to improve the quality of the communication and is as a consequence disabled. If a current strategy is disabled due to its evaluation, at least one other strategy is then enabled prior to moving to the next strategy. For instance, the strategy or strategies enabled after the disabling of a given strategy are selected from the group of strategies in a predetermined manner, for instance through a predetermined sequence. For instance, as illustrated by FIG. 2, if the bitrate strategy is detected as failing, the replication strategy is then enabled. If the replication strategy fails, the FEC strategy is then enabled. If the FEC strategy fails, the bitrate strategy is then enabled. However, any possible combination of strategies of the group may be enabled after a given strategy has failed, provided the combination does not include the strategy that has been disabled due to its detection as failing.

Figure 3:
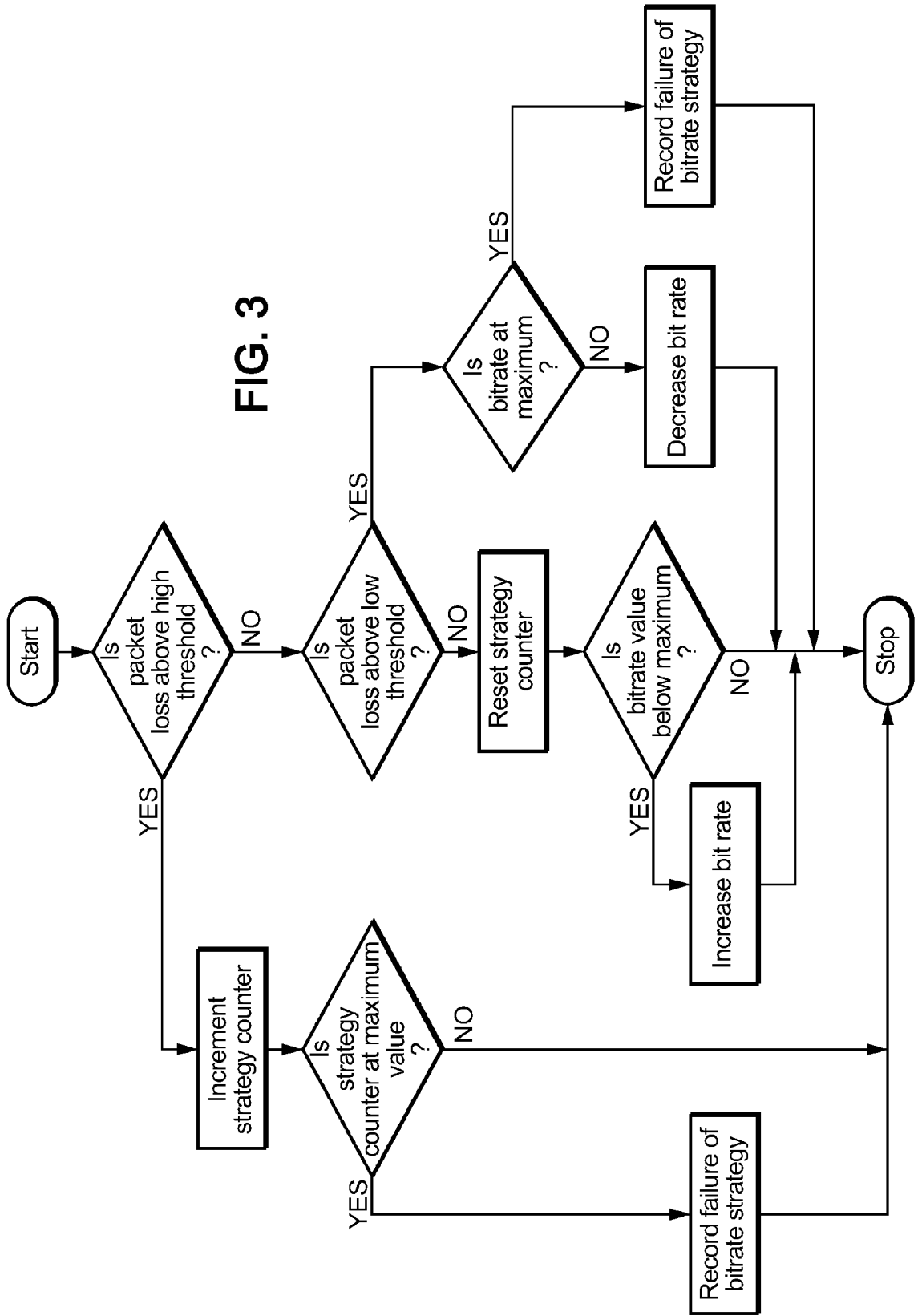
FIGS. 3, 4, 5, and 6 each illustrate a flow diagram associated to an evaluation of an error correction strategy in the method according to the invention.
Figure 4:
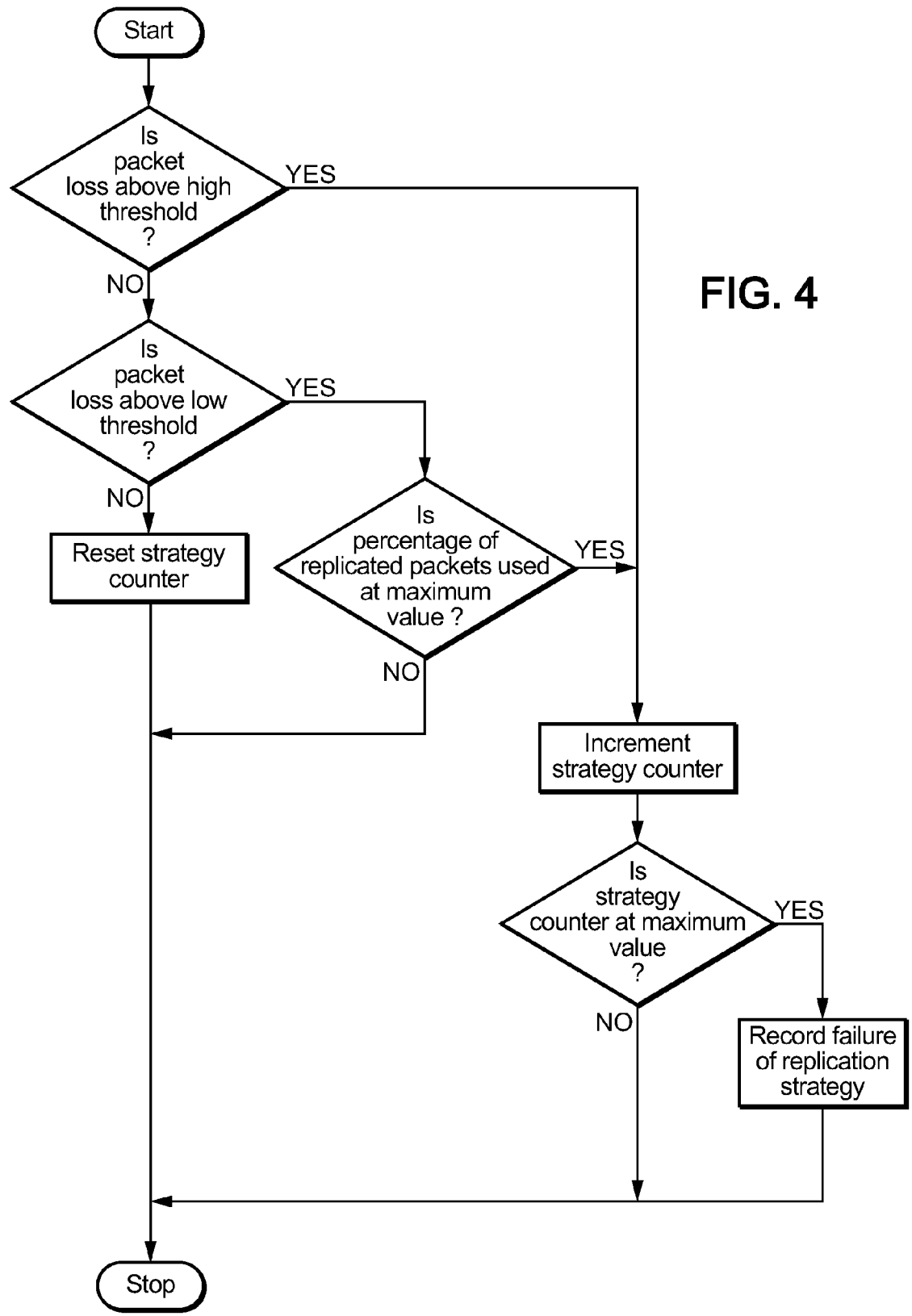
Figure 5:
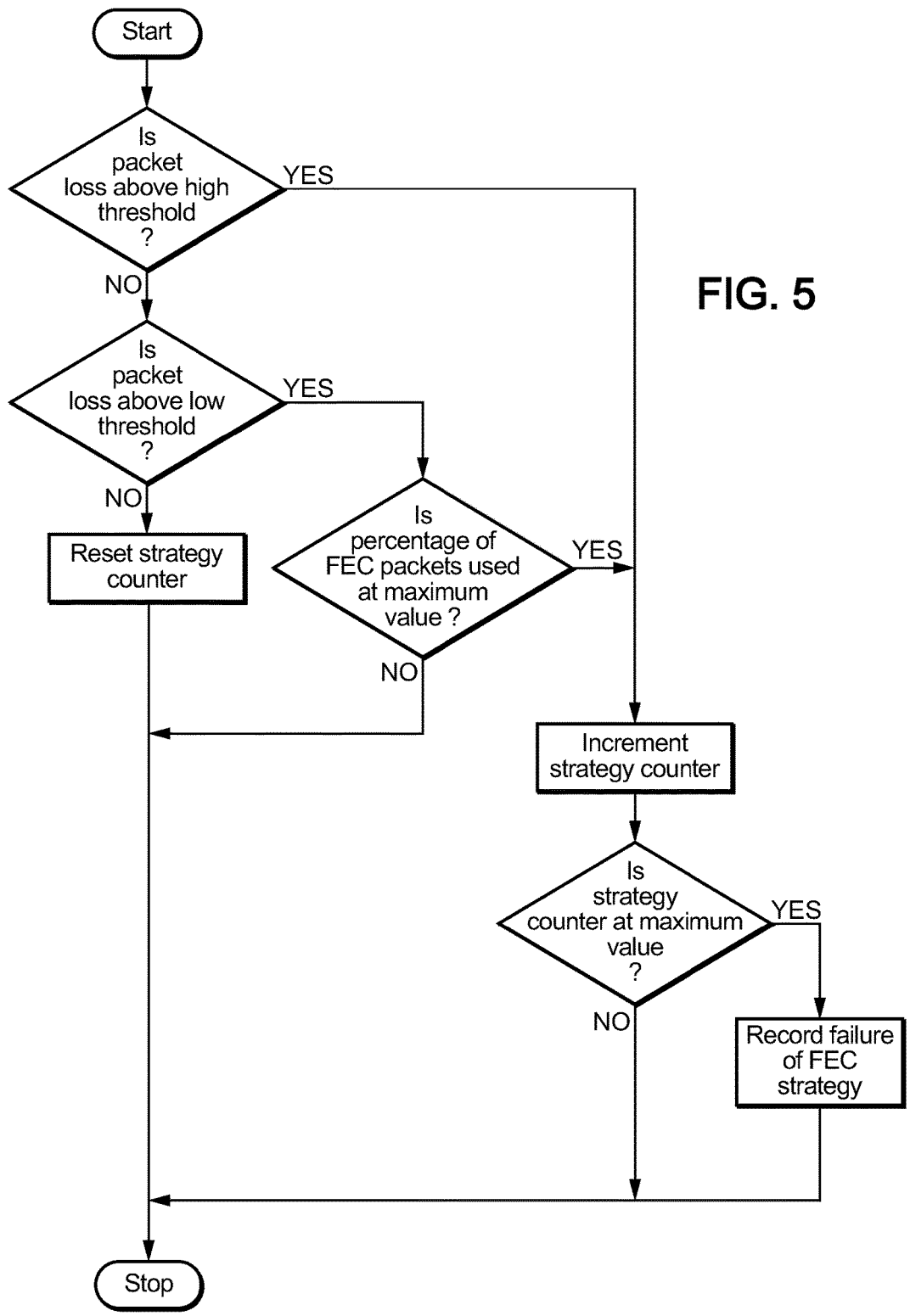

FIGS. 3 to 5 detail the evaluation process for the bitrate strategy, the replication strategy and the FEC strategy.

To that end, the device A keeps track of a strategy counter $C_i$ for each current strategy it employs. The strategy counter $C_i$ is a parameter which is indicative of the effectiveness of the corresponding strategy. As will be described below in more details, for a given time window, an analysis of the corresponding strategy is carried out (if the strategy was employed during the time window) and so is a determination of whether the value of strategy counter should be changed after the window to reflect the effectiveness of the corresponding strategy during this window.

For example, the strategy counters $C_i$ are stored in a memory MEMA, MEMB of the devices A, B. For instance, the strategy counters are integers. A given strategy counter $C_i$ is incremented when certain conditions detailed below are detected. A current strategy is then determined by the corresponding communication quality module CQMA, CQMB as failing when it reaches a chosen maximum value. For instance, the chosen maximum value is 3, 4 or more. In addition, for instance, the communication quality modules CQMA, CQMB are configured to dynamically adjust the maximum value as a function of predetermined conditions, such as the additional bandwidth required by the implementation of the associated strategy. For instance, the maximal value of a strategy counter will be lowered when the bandwidth required to implement the strategy increases. Alternatively, the chosen value is fixed throughout the communication.

In addition, the initial maximum value of a strategy counter may be chosen as a function of the additional bandwidth required by the strategy. For instance, a maximal value may be chosen inferior than that of another strategy when the additional bandwidth required by the strategy is above than that of the other strategy.

FIG. 3 illustrates the evaluation of the bitrate strategy.

Initially, the communication quality module CQMA determines if the packet loss is above a high threshold whose value is predetermined to correspond to an unacceptable packet loss. For instance, the high threshold is chosen to correspond to substantially 30% of packet loss. If the packet loss is in fact above the high threshold, the strategy counter of the bitrate strategy is incremented. Then, the strategy counter is compared to the maximum value. If it equals the maximum value, the bitrate strategy is detected as failing and the evaluation of the bitrate strategy stops. If it is below the maximum value, the evaluation stops.

If the packet loss is below the high threshold, the communication quality module CQMA determines if the packet loss is above a low threshold. For instance, the value of the low threshold is predetermined to correspond to a value above which packet loss is considered to become a problem for the communication. For instance, the low threshold is chosen substantially equal to 10% of packet loss.

If the packet loss is below the low threshold, the communication quality module CQMA resets the strategy counter of the bitrate strategy. For instance, its value is set to 0. The communication quality module CQMA then moves on to process the correction data related to the bitrate strategy, which is the bitrate value during the time window associated to the report R. If this bitrate value is lower than the maximum bitrate, the communication quality module CQMA commands an increase in the bitrate value to the bitrate driver BRDA for the next time window and the evaluation stops.

On the contrary, if the packet loss is above the low threshold, the communication quality module CQMA determines if the bitrate value contained in the report R corresponds to the minimum bitrate of the bitrate strategy. If the bitrate value is the minimum value, the bitrate strategy is determined by the communication quality module CQMA as failing and the process stops. If the bitrate value is not the minimum value, the communication quality module CQMA commands a decrease of the bitrate to the bitrate driver BRDA for the next time window and the evaluation stops.

For instance, the amount by which the bitrate is increased or decreased corresponds to a bitrate step whose value is predetermined beforehand.

FIG. 4 illustrates the evaluation of the replication strategy.

At a first step, the communication quality module CQMA determines if the packet loss is above the high threshold.

If the packet loss is above the high threshold, the communication quality module CQMA increments the strategy counter for the replication strategy, then moves on to compare it to its maximum value. If it is below the maximum value, the evaluation stops. If it equals the maximum value, the replication strategy is detected as failing by the communication quality module CQMA.

If the packet loss is below the high threshold, the communication quality module CQMA compares the packet loss to the low threshold.

If the packet loss is below the low threshold, the strategy counter is reset and the evaluation stops.

If the packet loss is above the low threshold, the communication quality module CQMA processes the correction data to determine if the percentage of replicated packets is at the maximum value.

If the percentage of replicated packets is at the maximum value, the strategy counter is incremented then compared to its maximum value. If it equals the latter, the strategy is detected as failing.

If the percentage of replicated packets is below the maximum value, the evaluation stops. Alternatively, the percentage of replicated packets sent by device A is modified, for instance lowered, or an additional parameter regarding the grouping of the replicated packets by device A is modified prior to the stopping of the evaluation.

FIG. 5 illustrates the evaluation of the FEC strategy.

At a first step, the communication quality module CQMA determines if the packet loss is above the high threshold.

If the packet loss is above the high threshold, the communication quality module CQMA increments the strategy counter for the replication strategy, then moves on to compare it to its maximum value. If it is below the maximum value, the evaluation stops. If it equals the maximum value, the FEC strategy is detected as failing by the communication quality module CQMA.

If the packet loss is below the high threshold, the communication quality module CQMA compares the packet loss to the low threshold.

If the packet loss is below the low threshold, the strategy counter is reset and the evaluation stops.

If the packet loss is above the low threshold, the communication quality module CQMA determines if the percentage of FEC packets is at the maximum value.

If the percentage of FEC packets is at the maximum value, the strategy counter of the FEC strategy is incremented and compared to the maximum value. If it equals the latter, the FEC strategy is detected as failing, and the evaluation stops. If not, the evaluation stops.

If the percentage of FEC packets is below the maximum value, the evaluation stops. Alternatively, the percentage of FEC packets sent by device A is modified prior to the stopping of the evaluation.

It should be noted that once a strategy has been detected as failing and is disabled, its strategy counter is reset.

In addition, as indicated above, the description of the analysis of a report was given for device A. Device B also carries out the above analysis for the reports R it receives from device A.

Figure 6:
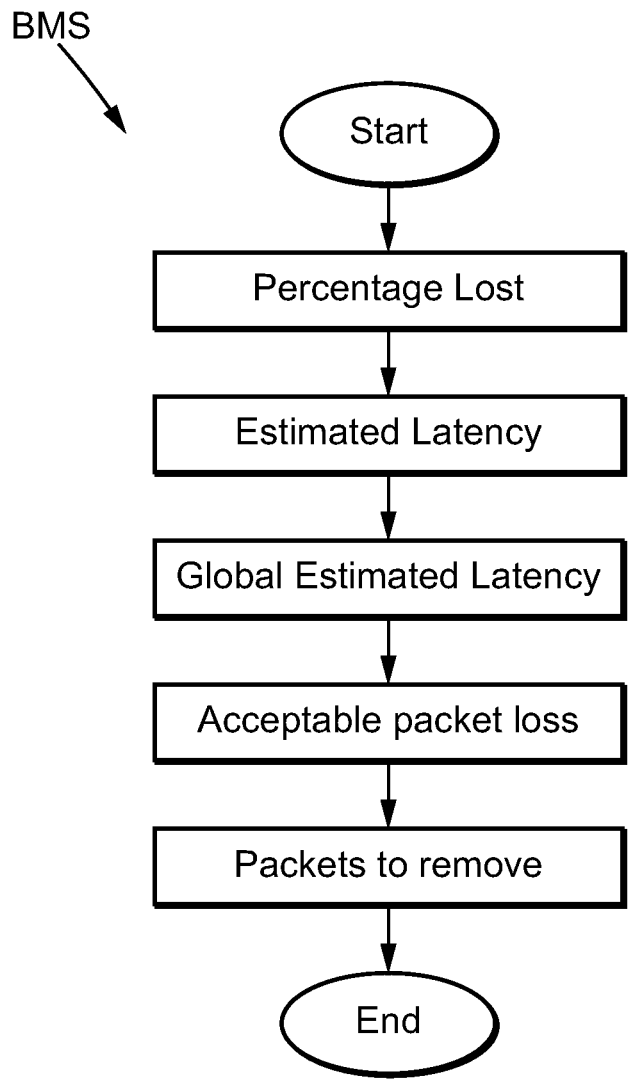

Advantageously, in view of FIG. 6, during the method described above, the media engine MEB of the first device implements the buffer management scheme BMS, the exchange of multimedia data being carried out in real-time conditions.

The scheme is used to determine how to remove from the buffer (memory MEMB) of the second device packets of the multimedia data. The scheme is carried out based on the determination of a percentage of packets to remove from the buffer for the current latency in transmission of the multimedia data.

Initially, the media engine MEB, and more particularly the real-time management module RTMB, determines a ratio between the lost packets and the packets received.

This ratio corresponds to a percentage, noted Percentage Lost. It is determined based on the following relationship:

Percentage Lost=$(100*p_1)/(p_1+P_r)$, where $p_1$ is the number of lost packets and $p_r$ is the number of received packets.

The number of lost packets is determined from the timestamps of the packets and from the knowledge of the duration of the data contained in the packets. When combined, these elements allow one to determine how many packets are missing.

Then the module RTMB determines an estimated latency based on the packets stored in the buffer. The estimated latency is based on the time stamps of the packets stored in the buffer, more precisely on the reception timestamp corresponding to the instant of reception of the packets (relative to the clock time of device B) and the emission timestamp which is the timestamp corresponding to the instant of emission of the packet by device A (relative to the clock time of device A). This estimation is further based on the clock difference between the two devices and on the transit time of the packet between the two devices. For a given packet, the corresponding estimated latency is determined via the following relationship:

Estimated Latency=$(t_r-t_e)+d_c+t_t$, where tr is the reception timestamp, $t_e$ is the emission timestamp, $d_e$ is the clock difference between the two devices, and $t_t$ is the transit time For instance, the clock difference, i.e. the time difference between the respective clocks of the devices, is determined from the knowledge of the time as reflected by the clock of device B and from data indicative of the time as reflected by the clock of device A. For instance, these data are sent by device A to device B upon initialization of the communication between the two devices.

Advantageously, device A sends clock information indicative of its clock time to device B at regular intervals. This allows for a compensation of any shift of the respective clocks of the devices over time.

A global estimated latency is then determined based on the estimated latency for the packets as determined above. For instance, the global estimated latency is obtained by averaging the estimated latencies over the different packets.

Next, an acceptable packet loss is determined based on the estimated latency.

The acceptable packet loss is determined through the following relationship:

Acceptable packet loss=(Estimated Latency/75.0).

For example, for a 100 ms latency, the acceptable packet loss may be determined as equaling 1.33%.

Next, the percentage of packets to remove is determined as the sum of the Percentage Lost and of the Acceptable packet loss.

The obtained result is then used to determine which packets to remove from the buffer. More precisely, the result corresponds to the percentage of packets of the buffer which are to be removed.

For instance, for a result of 5%, 5% of the packets of the buffer are removed.

In some embodiments, the packets are removed evenly across the buffer, i.e. regardless of the multimedia data they contain. For instance, for a result of 5%, every twentieth packet is deleted.

Optionally, the removal of the packets from the buffer is carried out based on a removal order. The removal order is determined based on the content of the multimedia data. The multimedia data contained in the packets is analyzed to determine if it corresponds to useful data, i.e. data which contain useful information or not. For instance, for multimedia data which contain voice information, useful information corresponds to effective voice data, as opposed to silences which amount for a sizeable portion of human oral communications. The removal of the packets is then carried out by removing the packets which do not contain useful information.

The above process is for instance cyclically carried out each time the buffer is filled with packets of multimedia data.

For instance, during a given cycle, the buffer is initially filled with a burst of packets newly received from the other device. Then, the packets contained in the buffer are subjected to the above process for a removal of part of them from the buffer. After the removal of these packets, the packets remaining in the buffer are converted by the media engine MEA, in particular by the corresponding CODEC, into audio data which is then rendered by the device. Thereafter, the buffer is emptied and the cycle ends.

The reduction of the size of the content of the buffer reduces the time which is required by the media engine MBA, MEB to render the content of the buffer as video and/or audio data, and therefore reduces the time interval between the video and/or audio data being captured by one device and the time at which the corresponding audio and/or video data can be visualized or heard through the other device.

Some of the advantages of the present invention have been mentioned above. In particular, the fact that each current error strategy is constantly evaluated prevents scenarios in which a strategy which does not effectively contribute to improve the quality of the communication is kept enabled.

In addition, such an evaluation presents an enhanced precision as it relies both on information related to the general conditions of the communication (packet loss, jitter, latency) and also on strategy-specific data, in particular data quantifying the use of each strategy by the other device.

Moreover, the use of a counter which can be gradually incremented under specific conditions allows for a more refined and customizable way of evaluating the strategies themselves.

The method according to the invention further allows many strategies as well as combination of strategies to be employed to adjust the quality of the communication, thereby being customizable and efficient for different configurations.

It should be noted that many modifications and variations of the present invention are made possible in the light of the above teachings. It is therefore to be understood that within the scope of the appended claims, the invention may be practiced otherwise than as specifically described.

The invention claimed is:

1. A method for communicating multimedia data between a first device and a second device over a network, the method comprising:

repeatedly generating multimedia data via a first device, the multimedia data comprising audio data and/or video data;

sending said multimedia data to a second device;

repeatedly receiving from the second device quality data representative of the quality of the communication between the first and second devices;

applying, via the first device, at least one current error correction strategy selected from a group of error correction strategies in order to increase the quality of the communication between the first and second devices; and evaluating the effectiveness of each current error correction strategy on the quality of the communication between the two devices as a function of newly received quality data, wherein the first device keeps track of a strategy counter for each of the current error correction strategies, the strategy counter of a given error correction strategy being incremented at least when a packet loss for the multimedia data sent by the first device is above a chosen threshold.

2. The method according to claim 1, wherein, for each current correction strategy, the first device determines, as a function of said effectiveness, whether said current correction strategy is to be modified.

3. The method according to claim 2, wherein for each current correction strategy, the first device modifies at least one parameter of said current error correction strategy as a function of said effectiveness.

4. The method according to claim 2, wherein for each current correction strategy, the first device replaces said current error correction strategy by another error correction strategy as a function of said effectiveness.

5. The method according to claim 1, wherein the quality data comprise general quality data representative of the overall communication quality and correction data representative of a quantity of packets of the multimedia data corrected by the second device using each current error correction strategy, the first device carrying out said evaluation as a function of both the general quality data and the correction data sent by the second device.

6. The method according to claim 5, wherein the general quality data comprise information representative of packet loss, jitter and/or latency between the two devices, the first device selecting at least one error correction strategy from the group of error correction strategies and applying said at least one error correction strategy when at least one element among packet loss, jitter and latency is above a chosen threshold.

7. The method according to claim 1, wherein the quality data are organized in reports sent at regular intervals and the first device carries out said evaluation upon reception of each report.

8. The method according to claim 1, wherein the strategy counter of a given error correction strategy is reset at least when the packet loss for the multimedia data sent by the first device is below a chosen low threshold.

9. The method according to claim 1, wherein a given error correction strategy is detected as failing when the associated strategy counter reaches a chosen maximum value and is deactivated.

10. The method according to claim 1, wherein the group of error correction strategies comprises at least a bitrate strategy, a replication strategy, and a forward error correction strategy.

11. The method according to claim 1, wherein at least the second device employs a buffer management scheme to process the multimedia data sent by the first device so that the communication between the two devices occurs in real-time conditions.

12. The method according to claim 11, wherein the multimedia data are exchanged in the form of packets which are temporarily stored in a buffer memory of the second device, and wherein the buffer management scheme includes removing at least some of the packets from the buffer memory prior to the content of the buffer memory being rendered by the second device.

13. The method according to claim 12, wherein the buffer management scheme includes determining packets to remove from the buffer memory and removing said packets, said packets to remove being determined as a function of a number of lost packets, a number of received packets and an estimated latency between the two devices.

14. The method according to claim 13, wherein the packets are removed evenly across the buffer memory.

15. The method according to claim 13, wherein the packets to remove are also determined as a function of the multimedia data they contain.

16. The method according to claim 1, wherein over at least a period of time:

both devices repeatedly generate multimedia data and send said multimedia data to the other device;

both devices repeatedly generate quality data representative of the quality of the communication between the two devices;

both devices apply at least one current error correction strategy selected from a group of error correction strategies, in view of increasing the quality of the communication between the devices; and an evaluation of an effectiveness of each current error correction strategy on the quality of the communication between the two devices is carried out as a function of newly received quality data.

17. A non-transitory computer readable medium having stored thereon instructions, which when executed by a processor, cause a method for communicating multimedia data between a first device and a second device over a network to be performed, wherein said method comprises:

repeatedly generating multimedia data via a first device, the multimedia data comprising audio data and/or video data;

sending said multimedia data to a second device;

repeatedly receiving from the second device quality data representative of the quality of the communication between the first and second devices;

applying, via the first device, at least one current error correction strategy selected from a group of error correction strategies in order to increase the quality of the communication between the first and second devices; and evaluating the effectiveness of each current error correction strategy on the quality of the communication between the two devices as a function of newly received quality data, wherein the first device keeps track of a strategy counter for each of the current error correction strategies, the strategy counter of a given error correction strategy being incremented at least when a packet loss for the multimedia data sent by the first device is above a chosen threshold.

18. A communication quality device configured to receive quality data representative of the quality of a communication between first and second devices exchanging multimedia data over a network, the multimedia data comprising audio and/or video data;

at least a first device being adapted to apply at least one current error correction strategy selected from a group of error correction strategies in view of increasing the quality of the communication between the first device and a second device;

the communication quality device being configured to carry out an evaluation of an effectiveness of each current error correction strategy on the quality of the communication between the two devices as a function of newly received quality data, wherein the first device keeps track of a strategy counter for each of the current error correction strategies, the strategy counter of a given error correction strategy being incremented at least when a packet loss for the multimedia data sent by the first device is above a chosen threshold.

19. A communication device comprising a communication quality device according to claim 18.

* * * * *